Oct. 17, 1933.   L. M. YOUNG   1,931,311
BONDING RESTRICTED JOINT
Filed Nov. 14, 1932

INVENTOR.
Leon M. Young
BY
A. S. Kroh
ATTORNEY

Patented Oct. 17, 1933

1,931,311

UNITED STATES PATENT OFFICE 1,931,311

BONDING RESTRICTED JOINT

Leon M. Young, Racine, Wis., assignor to Young Radiator Company, Racine, Wis., a corporation of Wisconsin Application November 14, 1932
Serial No. 642,556

2 Claims. (Cl. 285—49)

My invention relates principally to joints or other assemblies, wherein certain parts are assembled and then soldered, brazed or otherwise bonded together, but after certain dissimilar material part or parts have been inserted, whereby the flow of molten bonding material is restricted or confined to a predetermined area for a purpose which will hereinafter appear.

The object of my invention is to insure a complete and substantial bonding of the assembly without waste of bonding material, and also to prevent the flow of molten bonding material to places where it would be harmful.

In the foregoing and following description and claims, I wish it understood that the term "similar material" is used to designate any kind of or combination of materials which have an affinity for the bonding material used, and that the term "dissimilar material" is used to designate any kind of material which has no affinity for the bonding material used, or in other words a material that cannot readily be soldered, brazed or bonded by the bonding material used.

It is well known that when soldering, brazing, or bonding, the molten bonding material will travel by capillary attraction to remote places. This is especially true of closely fitted assemblies, and when there are threaded openings, it is difficult to prevent the molten material from creeping into the threads or filling the opening.

The bonding operation is, therefore, frequently difficult, inefficient and wasteful.

It is well known that there are many dissimilar materials that cannot be readily soldered, brazed or bonded and that molten bonding material will not readily travel over such dissimilar materials, nor will it travel by capillary attraction or otherwise between closely fitted similar and dissimilar materials, nor between surfaces of similar material if there is a thin strip of dissimilar material therebetween.

The object of my invention is to restrict the flow of the molten bonding material, or in other words to confine its flow to a certain predetermined area by means of a gate or stop consisting of dissimilar material such as aluminum, chome, fibre, or any such materials when plastic or semiplastic, which is positioned in the proper shape in, on, around, or between the restricted area before or after the assembling operation.

My invention is especially adapted for use on reinforcing plates or pipe flanges when attached to radiator heads, the walls of which are usually thin and fragile and the plates usually having threaded openings, or on gas or liquid valves and the like, where certain parts are bonded after being assembled and wherein the assembly would be injured or destroyed if even a very small particle of bonding material should reach the valve surfaces.

In devices of the class described, the usual practice after the assembly is completed is to first apply a suitable flux between the surfaces to be bonded after which the parts are heated by means of a torch and the bonding material applied to the heated joint, the parts being heated to a sufficient temperature to cause the bonding material to flow freely between the entire surfaces. With my improved device a predetermined surface is protected by the use of the dissimilar material gate or stop; this gate is preferably made of thin aluminum or other material which will remain in the joint throughout the life of the device to also act as a gate if at some future time the joint should become loosened in which case another bonding operation is required similar to the original.

To these and other useful ends this invention consists in matter hereinafter set forth and claimed and shown in the accompanying drawing in which:

Figure 1:
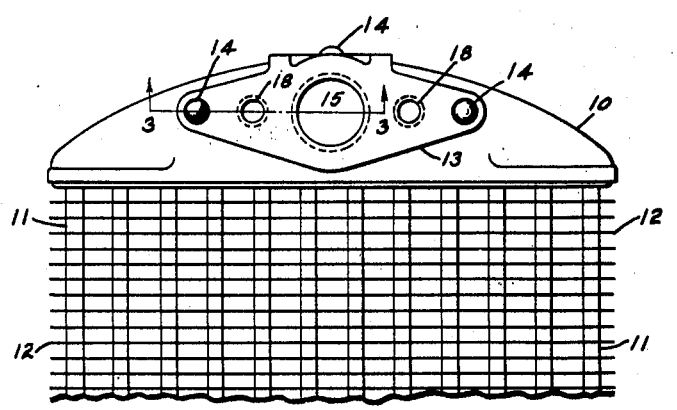
Fig. 1 is a front fractional elevation of the top portion of a conventional radiator wherein my invention is shown.
Figure 2:
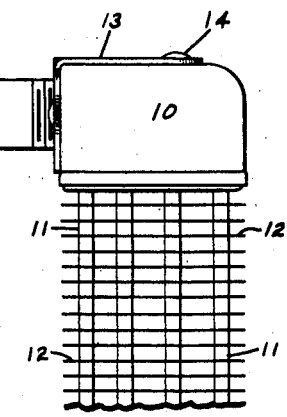
Fig. 2 is a fractional side view of the radiator, as shown in Fig. 1.
Figure 3:
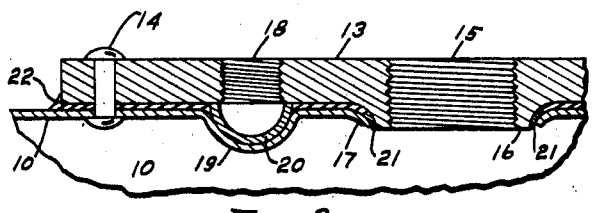
Fig. 3 is a fractional sectional view (considerably exaggerated) showing my improved joint as viewed from line 3 of Fig. 1.

As thus illustrated in Figs. 1, 2 and 3 my improved joint is shown as used on a conventional radiator which consists of an upper header 10, core tubes 11 and radiating fins 12. The walls of header 10 are usually made of thin and fragile material such as brass or copper. The reinforcing plate 13 is therefore provided, being made preferably L-shape so as to fit over the end as well as the face of the header, and riveted thereto as at 14, thus holding the plate 15 into position before the soldering or bonding operation.

The threaded opening 15 provides connecting means for the inlet or outlet pipes and is made in a manner to thereby form a flange 16. An opening in the header 10 is similarly formed so as to provide a flange 17 which closely embraces the flange 16 as clearly illustrated in Fig. 3. I also show threaded openings 18 in the plate 13, thereby supplying means for attaching other parts to the assembly.

A depression 19 is formed in the header 10 so as to register with openings 18 as indicated in Fig. 3, thereby providing a space into which the bolts when screwed into the openings 18 may project into the opening formed by the depression 19, otherwise a slightly longer bolt than specified might tear the plate from the header to which it is bonded or fracture the header.

When thus formed, without the use of my invention, the openings 18 and pocket formed by the depression 19 would likely be filled or partially filled with the bonding material or considerable bonding material might flow past the flanges 16 and 17 and into the header in the manner heretofore described. To prevent this I provide preferably a cup-shaped stop 20 of dissimilar material preferably aluminum which is adapted to fit into the depression 19. The edge of the cup 20 is adapted to snugly contact with the plate 13, or the edge of this cup 20 may be flanged outwardly so as to fit snugly between the plate 13 and header 10, it being understood that the cup 20 is preferably made from very thin aluminum, and not over four one-thousandths of an inch thick.

When assembling the plate 13 to the header 10, the cup 20 is first placed into position and preferably a plastic dissimilar material 21 is then applied to the outside edge of flange 16; the plate 13 is then placed into position and riveted to the header as at 14. Thus the dissimilar material cup 20 and dissimilar plastic material 21 will effectively form a seal against leakage of the bonding material 22, when in a molten state, past the stops of dissimilar material.

It will be understood that a plastic or semi-plastic material may be used instead of cup 20, in which case the depression 19 and opening 18 may be partially or completely filled with plastic dissimilar material which can be readily removed after the bonding operation. It will also be understood that a washer or ring made of aluminum or other dissimilar material may be used in lieu of the plastic material 21.

Thus I provide means whereby the joint may be easily and quickly bonded together without the loss of bonding material and without its flowing into openings where it would be harmful and require removal.

Figure 4:
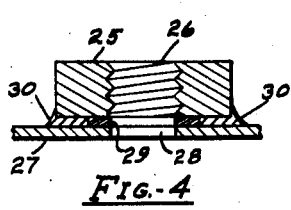
Fig. 4 is a fractional sectional view of a modification of my invention.

Referring to the modification shown in Fig. 4, it will be seen that a plate 25 is provided with a threaded opening 26 and that a header front 27 is provided with an opening 28 which registers with opening 26, a washer 29 of thin dissimilar material is positioned between the plate 25 and header front 27, at the time these parts are assembled together. When the binder material 30 is applied in molten form it will intimately bond 25 and 27 up to the washer 29 as indicated, thus forming an efficient bonding between the parts 25 and 27 but no bonding material will be permitted to reach the openings 26 and 28. This showing is comparable to the opening 15 as illustrated in Figs. 1 and 3.

Figure 5:
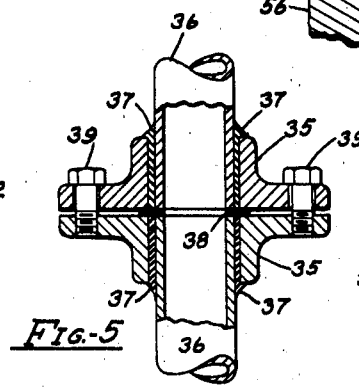
Fig. 5 is a sectional view of a flanged joint wherein my invention is shown.

A further modification is shown in Fig. 5, wherein a flanged coupling is shown as having been assembled with a stop of dissimilar material and the pipes bonded to the flanges thereafter, after which the coupling can be taken apart and reconnected with a conventional gasket. In this figure, 35 designates the flanged part of the coupling and 36 the pipes, which have been bonded to the flanges 35 by bonding material 37 after the parts have been assembled and the washer 38 of dissimilar material has been placed into position and the couplings then connected together by means of the bolts 39.

Figure 6:
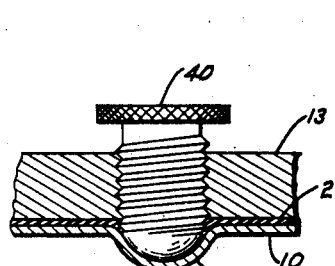
Fig. 6 is a fractional sectional view of a modification of the form of my invention as shown in Fig. 3.

Fig. 6 is a modification of the dissimilar material stop as shown in detail in Fig. 3, the assembly differing only in that the stop of dissimilar material is made in the form of a screw threaded plug 40, which can be readily removed after the bonding operation, thus forming an effective stop to the flow of bonding material when in a molten state into the opening or pocket.

It is common practice to bond certain similar material parts of various other assemblies, usually consisting of small delicate parts, particularly gas or liquid valves such as are used on refrigerators and the like. For the purpose of illustration, I have shown one of such valves in Fig. 7, wherein 45 designates the body of the valve. The cap 46 is supplied with an opening 47 and valve seat 48. This cap 46 is preferably screw threaded into the body 45 as indicated. A seat or ledge 48 is provided and the face of the cap adapted to closely approach this ledge 48 when the cap is screwed into position as indicated.

Figure 8:
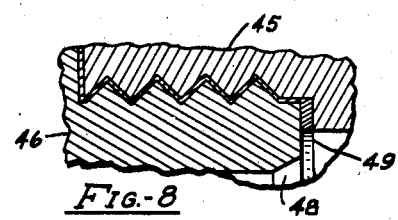
Fig. 8 is an enlarged fractional sectional view of the invention as shown in Fig. 7.

Before assembling, the gasket or washer 49 of dissimilar material is inserted after which the cap 46 is inserted and bonded in the well known manner. Fig. 8 which is considerably exaggerated clearly indicates the washer 49 and bonding material 50.

Figure 7:
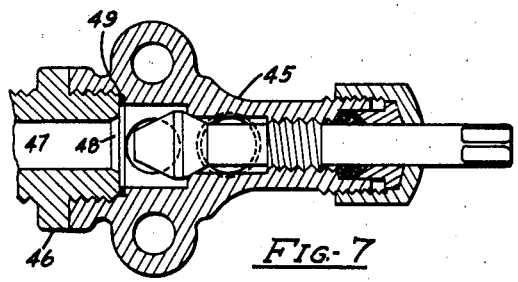
Fig. 7 is a sectional view of a type of valve used on refrigerators and the like in which my invention is shown.
Figure 9:
Fig. 9 is an enlarged fractional sectional view of a modification of the invention as illustrated in Fig. 7.

A modification of the valve as shown in Fig. 7 is illustrated in Fig. 9 wherein no ledge is provided. In this construction 55 designates the body of the valve and 56 the cap which is shown as screw threaded into the body 55. No ledge, however, is provided in this construction. Before the cap 56 is inserted a small quantity of plastic dissimilar material or paint 57 is applied either to the bottom of the threads in the body 55 or on the thread at the end of cap 56, after which the cap is inserted and the parts bonded together in the well known manner. In this figure the bonding material is designated by the numeral 58. Thus it will be seen that the molten bonding material cannot reach the interior of the valve.

It will be understood that Fig. 7 designates a well known two-way double seated valve, too well known to require further description. Obviously my invention is applicable to many forms of assemblies, and can be made use of in many forms and designs, without departing from the scope of my invention.

Having thus shown and described my invention, what I claim is:

1. A joint of the class described, comprising a header plate, a reinforcing plate, a bonding material, and a stop of dissimilar material, said reinforcing plate having threaded openings, depressions in said header plate slightly larger in diameter than said threaded openings and adapted to register therewith, said stop formed of thin material and adapted to fit snugly into said depressions, the edge of which contacts said header plate, said reinforcing plate intimately bonded to said header plate by said bonding material, substantially as described.

2. A joint of the class described, comprising an assembly of closely fitting similar materials, a thin washer of dissimilar material, a bonding material, said washer positioned between said similar materials thereby to limit the flow of bonding material to a predetermined area, said predetermined area being intimately bonded together by said bonding material, substantially as described.

LEON M. YOUNG.